US012731439B2

(12) United States Patent
Sankai et al.

(10) Patent No.: US 12,731,439 B2
(45) Date of Patent: Sep. 8, 2026

(54) HAND-MOTION MONITORING APPARATUS AND HAND-MOTION MONITORING METHOD

(71) Applicant: CYBERDYNE Inc., Tsukuba (JP)

(72) Inventors: Yoshiyuki Sankai, Tsukuba (JP); Taichi Obinata, Tsukuba (JP)

(73) Assignee: CYBERDYNE Inc., Tsukuba (JP)

(*) Notice: Subject to any disclaimer, the term of this patent is extended or adjusted under 35 U.S.C. 154(b) by 210 days.

(21) Appl. No.: 18/842,764

(22) PCT Filed: Dec. 28, 2022

(86) PCT No.: PCT/JP2022/048535
§ 371 (c)(1),
(2) Date: Aug. 29, 2024

(87) PCT Pub. No.: WO2023/166842
PCT Pub. Date: Sep. 7, 2023

(65) Prior Publication Data
US 2025/0174047 A1 May 29, 2025

(30) Foreign Application Priority Data
Mar. 3, 2022 (JP) ................................ 2022-032936
Oct. 25, 2022 (JP) ................................ 2022-170809

(51) Int. Cl.
*G06V 40/20* (2022.01)
*G06T 7/70* (2017.01)

(52) U.S. Cl.
CPC ................ *G06V 40/28* (2022.01); *G06T 7/70* (2017.01); *G06T 2207/10016* (2013.01);
(Continued)

(58) Field of Classification Search
CPC ........ G06V 40/28; G06V 20/52; G06V 20/64; G06T 7/70; G06T 2207/10016;
(Continued)

(56) References Cited

FOREIGN PATENT DOCUMENTS

JP 2019-219554 A 12/2019
JP 2022-019356 A 1/2022

OTHER PUBLICATIONS

Rashmi Bakshi, "Automated Tracking of Hand Hygiene Stages", Thesis presented for the degree of Master of Philosophy, pub. 2021, (Year: 2021).*

(Continued)

*Primary Examiner* — Mekonen T Bekele
(74) *Attorney, Agent, or Firm* — Procopio, Cory, Hargreaves & Savitch LLP

(57) ABSTRACT

Included are a behavior recognition unit that recognizes from the transition state of the posture of a subject person a hand-motion behavior that is a linkage of a plurality of local actions based on pieces of three-dimensional skeleton information sequentially obtained by a skeleton information acquisition unit, a behavior checking unit that checks the hand-motion behavior recognized by the behavior recognition unit while determining if the recognition accuracy of each of the local actions of the hand-motion behavior is lower than a predetermined threshold, and an action improvement proposal unit that, based on the result of the check performed by the behavior checking unit, gives the subject person feedback about a proposal for improving a local action with recognition accuracy lower than the threshold among the local actions of the hand-motion behavior.

10 Claims, 7 Drawing Sheets

(52) U.S. Cl.
CPC ............... *G06T 2207/10024* (2013.01); *G06T 2207/10028* (2013.01); *G06T 2207/30196* (2013.01)

(58) Field of Classification Search
CPC . G06T 2207/10024; G06T 2207/10028; G06T 2207/30196; H04N 7/18
See application file for complete search history.

(56) References Cited

OTHER PUBLICATIONS

Dinh-Son Tran et al. "Real-Time Hand Gesture Spotting and Recognition Using Rgb- D Camera and 3DConvolutional Neural Network" Applied Science, published: Jan. 20, 2020, (Year: 2020).*
International Search Report received in PCT/JP2022/048535, dated Mar. 28, 2023, in 5 pages (with translation).
Extended European Search Report received in EP22929984.7, dated Nov. 14, 2025, in 7 pages.
Obinata, Taichi et al., "Development of Handwashing Monitoring System toward Safe Living of People Requiring Long-term Care", IEEE, Jan. 9, 2022, pp. 864-869, 6 pages.

* cited by examiner

1 HAND-WASHING MONITORING APPARATUS
2
CONTROL UNIT
3
RGB-D SENSOR
4
VIDEO/AUDIO OUTPUT UNIT
5
CONTROLLER
6
DATA STORAGE UNIT
10
IMAGE COORDINATES SETTING UNIT
11
COORDINATES EXTRACTION UNIT
12
SKELETON INFORMATION ACQUISITION UNIT
13
BEHAVIOR RECOGNITION UNIT
14
BEHAVIOR CHECKING UNIT
15
ACTION IMPROVEMENT PROPOSAL UNIT

FIG. 3

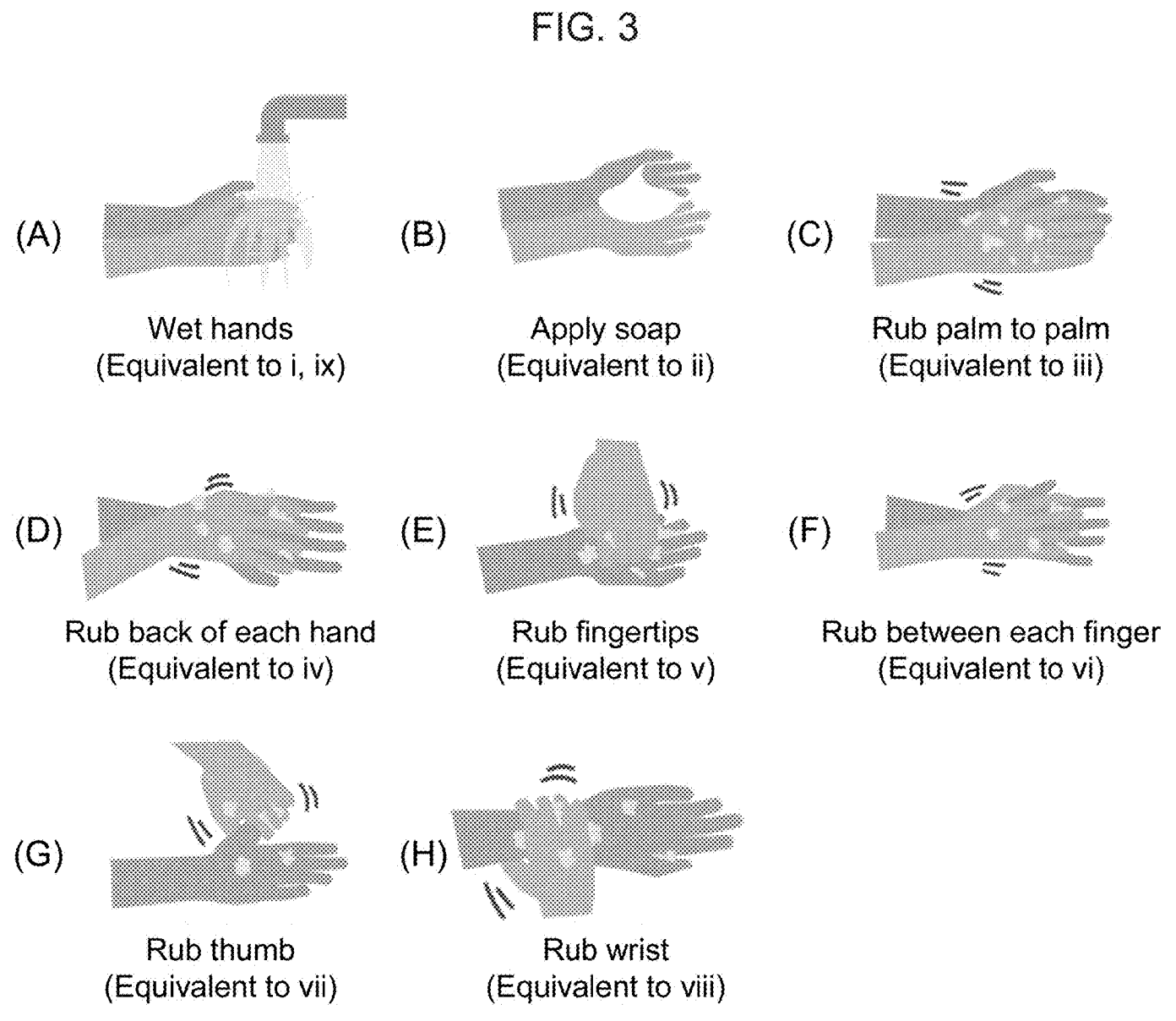

(A) Wet hands (Equivalent to i, ix)

(B) Apply soap (Equivalent to ii)

(C) Rub palm to palm (Equivalent to iii)

(D) Rub back of each hand (Equivalent to iv)

(E) Rub fingertips (Equivalent to v)

(F) Rub between each finger (Equivalent to vi)

(G) Rub thumb (Equivalent to vii)

(H) Rub wrist (Equivalent to viii)

| Action | Accuracy[%] |
|---|---|
| Wet hands | 97.5 |
| Apply soap | 95.9 |
| Rub palm to palm | 98.7 |
| Rub back of the hand | 67.0 |
| Rub fingertips | 94.0 |
| Rub between each finger | 97.2 |
| Rub thumb | 91.9 |
| Rub wrist | 94.1 |
| else | 90.6 |
| Total | 91.1 |

| Trial | Actions NOT performed | Frames |
|---|---|---|
| 1 | Rub fingertips | 0 |
| 2 | Rub between each finger | 92 |
| 3 | Rub thumb | 6 |
| 4 | Rub wrist | 0 |
| 5 | Rub back of the hand | 0 |
| | Rub fingertips | 0 |
| | Rub between each finger | 24 |
| | Rub thumb | 0 |
| | Rub wrist | 0 |

HAND-MOTION MONITORING APPARATUS AND HAND-MOTION MONITORING METHOD

CROSS-REFERENCE TO RELATED APPLICATIONS

This application is a U.S. national stage application of International Application No. PCT/JP2022/048535, filed Dec. 28, 2022, which claims benefit of priority from JP 2022-032936, filed Mar. 3, 2022, and JP 2022-170809, filed Oct. 25, 2022, the contents of which are incorporated herein by reference in its entirety for all purposes.

TECHNICAL FIELD

The present invention relates to a hand-motion monitoring apparatus and a hand-motion monitoring method. For example, the present invention proposes a hand-motion monitoring apparatus and a hand-motion monitoring method for prompting the elderly or those in need of nursing care to improve their hand-washing behaviors to proper ones.

BACKGROUND ART

The elderly and those in need of nursing care, who have impaired immunity, cognitive function, or physical function, are said to have a high risk of serious injuries or diseases. To ensure the health and safety of people in need of long-term nursing care, daily activities for preventing or reducing the risk of injuries and diseases are carried out in long-term care facilities and nursing homes. Examples of such activities include monitoring for fall, maintaining a good posture during a meal, receiving oral care, washing hands, doing disinfection, and doing ventilation.

In particular, hand washing and hand disinfection are the fundamentals of infection control measures, and should be conducted by both caregivers and those in need of nursing care. However, it has been reported that in care facilities in Japan, the percentage of regular checks conducted on the hand washing of caregivers is only 50%. Thus, it is considered necessary to take measures to make hand hygiene practices common.

In addition, caregivers may wash their hands in the wrong order or fail to wash their hands accidentally. Further, it is also conceivable that those in need of nursing care will be unable to wash their hands properly due to a decrease in their cognitive function. In such a case, caregivers should stay close to and look after those in need of nursing care to see if they are washing their hands properly. This, however, is difficult in practice, considering the burden on the caregivers.

So far, a hand-washing assist system has been proposed that prompts a worker to perform an exemplary hand-washing action in the proper order (see Patent Literature 1). The hand-washing assist system is configured to display on the same screen of a display unit both a hand image obtained by imaging the hands of a worker who is performing a hand-washing action, and an exemplary hand-washing image representing an exemplary hand-washing action in the proper order for the the worker.

The hand-washing assist system is configured to determine if a hand motion of the worker recognized from the hand image satisfies a matching condition for allowing the hand motion to match the exemplary hand motion represented by the exemplary hand-washing image, and display the result of the determination on the same screen, and to display instructive information for instructing the worker to move his/her hands to satisfy the matching condition.

Meanwhile, a hand-washing evaluation system has also been proposed that allows a user to self-recognize his/her hand-washing or disinfection action without placing a psychological burden on the user to improve his/her motivation to perform a proper hand-washing or disinfection action (see Patent Literature 2). The hand-washing evaluation system is configured to, as in Patent Literature 1 described above, display both a hand-washing action of a user and an exemplary hand-washing action on a screen, and analyze and evaluate the action from the image information on the user.

CITATION LIST

Patent Literature

Patent Literature 1: Japanese Patent Laid-Open No. 2019-219554

Patent Literature 2: Japanese Patent Laid-Open No. 2022-19356

SUMMARY OF INVENTION

Technical Problem

By the way, it is expected that diseases can be prevented or the risk of diseases can be reduced if there is a system that monitors hand-washing behaviors of a person in need of nursing care and his/her caregiver everyday to check if they are washing their hands properly, and that can prompt them to improve their hand-washing behaviors as needed.

However, since each of the hand-washing assist system of Patent Literature 1 and the hand-washing evaluation system of Patent Literature 2 is configured to evaluate one's hand-washing behavior by checking if the obtained image of his/her hand-washing action matches the displayed video of the exemplary hand-washing action, there is a problem in that only the rough recognition of the hand-washing action is possible. For example, specific fingertip motions, such as "rubbing fingertips" and "rubbing between fingers" cannot be recognized among various kinds of hand-washing actions. Thus, it would be difficult to determine if a user is washing his/her hands properly.

Further, in recent years, although there has been an ongoing research on the non-contact behavioral classification based on the three-dimensional skeleton information on humans, it would be difficult to measure the three-dimensional skeleton information on both the whole body and hands at the same time using a non-contact scheme. Thus, it is currently only possible to perform behavioral classification based on the skeleton information on the whole body excluding the information on the hands.

Thus, with the currently available method for evaluating one's hand-washing behavior using a non-contact scheme, it has been difficult to recognize specific actions including fingertip motions.

The present invention has been made in view of the foregoing points, and proposes a hand-motion monitoring apparatus and a hand-motion monitoring method each capable of prompting a subject person to improve his/her hand-motion behavior while monitoring the hand-motion behavior without placing a physical or psychological burden on the subject person.

Solution to Problem

To solve the foregoing problems, a hand-motion monitoring apparatus of the present invention includes an imaging unit that sequentially obtains RGB images and depth images by imaging an upper body including both hands of a subject person; an image coordinates setting unit that sets, as image coordinates, a plurality of representative skeleton points provided to the upper body mainly including the both hands of the subject person while estimating a posture of the upper body of the subject person based on the RGB images sequentially obtained from the imaging unit; a coordinates extraction unit that sequentially extracts, from the image coordinates set by the image coordinates setting unit image, coordinates related to a hand-motion behavior of the subject person based on a transition state of the posture of the subject person; a skeleton information acquisition unit that obtains pieces of temporally continuous three-dimensional skeleton information on mainly the both hands of the subject person by temporally synchronizing the image coordinates sequentially extracted by the coordinates extraction unit with the depth images sequentially obtained from the imaging unit; a behavior recognition unit that recognizes, from the transition state of the posture of the subject person, a hand-motion behavior that is a linkage of a plurality of local actions based on the pieces of three-dimensional skeleton information sequentially obtained by the skeleton information acquisition unit; a behavior checking unit that checks the hand-motion behavior recognized by the behavior recognition unit while determining if recognition accuracy of each of the local actions of the hand-motion behavior is lower than a predetermined threshold; and an action improvement proposal unit that, based on a result of the check performed by the behavior checking unit, gives the subject person feedback about a proposal for improving a local action with recognition accuracy lower than the threshold among the local actions of the hand-motion behavior.

Consequently, the hand-motion monitoring apparatus can give a subject person performing a hand-motion behavior, which mainly includes the actions of his/her fingertips, feedback about a proposal for improving his/her local action as needed while recognizing each local action in a non-contact manner, and can regularly perform monitoring without placing a physical or psychological burden on the subject person.

In the present invention, the image coordinates setting unit is configured to set the image coordinates on a two-dimensional coordinate system including one of right and left shoulder portions of the subject person as a coordinate origin, an X-axis lying in a direction of a line connecting the right and left shoulder portions with reference to the coordinate origin, and a Z-axis lying in a vertical direction with respect to the X-axis, and the skeleton information acquisition unit is configured to form a three-dimensional coordinate system by combining the depth images sequentially obtained from the imaging unit with the two-dimensional coordinate system of the image coordinates sequentially extracted by the coordinates extraction unit while setting a depth direction of the depth images as a Y-axis, and thus obtain the three-dimensional skeleton information.

Consequently, the hand-motion monitoring apparatus can, for the upper body mainly including the hands of the subject person, clarify the relationship between the position in the three-dimensional space and the position in the shot image, and thus obtain three-dimensional skeleton information while maintaining high robustness independently of the imaging position of the imaging unit.

Further, in the present invention, the behavior recognition unit is configured to sequentially recognize the local actions from the pieces of three-dimensional skeleton information sequentially obtained by the skeleton information acquisition unit while referring to a hand-motion-action recognition model that has been constructed through deep learning by using as training data an action recognition pattern set for each local action.

Consequently, the hand-motion monitoring apparatus can significantly improve the recognition accuracy and the recognition speed for each local action based on the three-dimensional skeleton information.

Further, in the present invention, the behavior checking unit is configured to set in advance a threshold for determining a shortage of action time of each local action so as to determine if each local action has terminated within the corresponding threshold, and confirm that a local action that has terminated within the corresponding threshold is recognized erroneously, and the action improvement proposal unit is configured to give feedback about a proposal for improving the local action that has been confirmed to be recognized erroneously by the behavior checking unit.

Consequently, the hand-motion monitoring apparatus can determine, with relatively high accuracy, if each of a plurality of local actions forming a hand-motion behavior of a subject person has been recognized erroneously.

Further, in the present invention, regarding a local action that has not been recognized by the behavior recognition unit due to a lack of the three-dimensional skeleton information among the local actions of the hand-motion behavior, the action improvement proposal unit is configured to give feedback to the effect that the local action is not recognizable.

Consequently, the hand-motion monitoring apparatus can, even for a local action that has not been recognized due to a lack of three-dimensional skeleton information, such as when the two hands of a subject person are too close or when the fingertips of the two hands are overlapping, give the subject person feedback to that effect, and inform the subject person under what circumstances such a local action is not recognizable.

Further, a hand-motion monitoring method of the present invention includes a first step of sequentially obtaining RGB images and depth images by imaging an upper body including both hands of a subject person; a second step of setting, as image coordinates, a plurality of representative skeleton points provided to the upper body mainly including the both hands of the subject person while estimating a posture of the upper body of the subject person based on the RGB images sequentially obtained in the first step; a third step of sequentially extracting from the image coordinates set in the second step image coordinates related to a hand-motion behavior of the subject person based on a transition state of the posture of the subject person; a fourth step of obtaining pieces of temporally continuous three-dimensional skeleton information on mainly the both hands of the subject person by temporally synchronizing the image coordinates sequentially extracted in the third step with the depth images sequentially obtained in the first step; a fifth step of recognizing, from the transition state of the posture of the subject person, a hand-motion behavior that is a linkage of a plurality of local actions based on the pieces of three-dimensional skeleton information sequentially obtained in the fourth step; a sixth step of checking the hand-motion behavior recognized in the fifth step while determining if recognition accuracy of each of the local actions of the hand-motion behavior is lower than a predetermined threshold; and a seventh step of, based on a result of the check performed in the sixth step, giving the subject person feedback about a proposal for improving a local action with recognition accuracy lower than the threshold among the local actions of the hand-motion behavior.

Consequently, with the hand-motion monitoring method, it is possible to give a subject person performing a hand-motion behavior, which mainly includes the actions of his/her fingertips, feedback about a proposal for improving his/her local action as needed while recognizing each local action in a non-contact manner, and regularly perform monitoring without placing a physical or psychological burden on the subject person.

Advantageous Effects of Invention

According to the present invention, it is possible to implement a hand-motion monitoring apparatus and a hand-motion monitoring method each capable of prompting a subject person to improve his/her hand-motion behavior while monitoring the hand-motion behavior without placing a physical or psychological burden on the subject person.

BRIEF DESCRIPTION OF DRAWINGS

FIG. 3 is a conceptual view for describing a plurality of local actions forming a hand-washing behavior.

DESCRIPTION OF EMBODIMENTS

Hereinafter, an embodiment of the present invention will be described in detail with reference to the drawings.

(1) Configuration of Hand-Washing Monitoring Apparatus of this Embodiment

Figure 1:
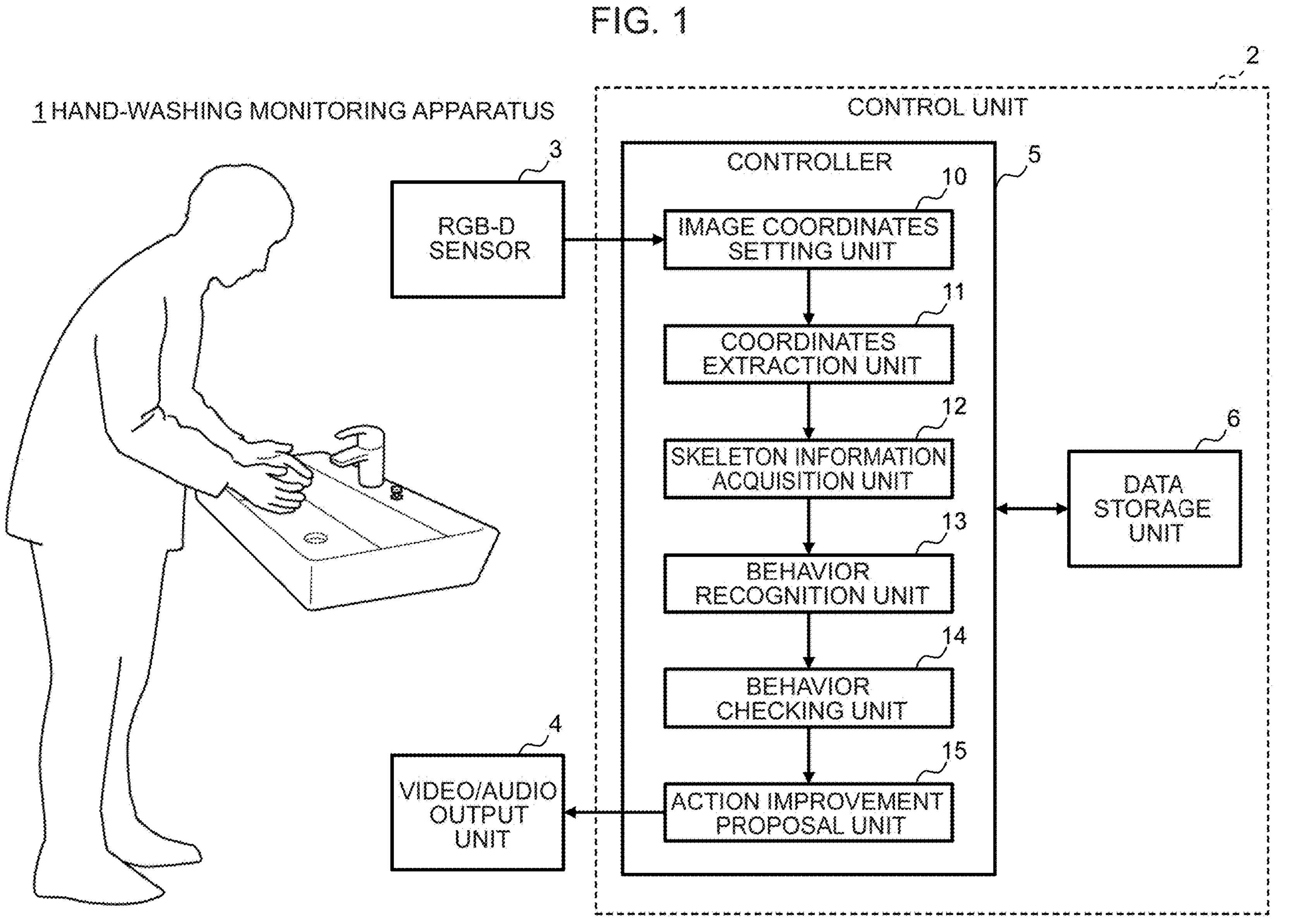
FIG. 1 is a conceptual view for describing a hand-washing monitoring apparatus according to this embodiment.

FIG. 1 illustrates the overall configuration of a hand-washing monitoring apparatus 1 of this embodiment. The hand-washing monitoring apparatus 1 is disposed in a hand-washing facility within a subject person's home, and includes a control unit 2 that controls the entire apparatus, and an RGB-D sensor (i.e., an imaging unit) 3 and a video/audio output unit 4 each connected to the control unit 2.

The RGB-D sensor 3 includes, in addition to an RGB color camera function, a depth sensor that can measure the distance from the camera to the subject person. Thus, the RGB-D sensor 3 can scan the subject person three-dimensionally. When a LiDAR camera L515 of RealSense (trademark name of U.S. Microsoft Corporation) is applied as the RGB-D sensor 3, for example, the depth sensor includes a LiDAR sensor, and measures the time from when a laser beam is emitted to when the laser beam impinges on an object and is returned back from the object, and thus measures the distance to and the direction of the object.

Note that in the RGB-D sensor 3, the RGB camera has a resolution of 640 pixels×360 pixels and a frame rate of 30 [fps], and the depth sensor has a resolution of 1024 pixels×768 pixels and a frame rate of 30 [fps].

In practice, the RGB-D sensor 3 is disposed to image the upper body including both hands of the subject person with reference to the standing position of the subject person and the faucet in the hand-washing facility, and sequentially obtains RGB images and depth images as a result of imaging.

The control unit 2 includes a controller 5 including a CPU (Central Processing Unit) that controls the entire system in an integrated manner, and a data storage unit 6 including a database of various types of data stored in a readable and writable manner in response to instructions from the controller 5.

The video/audio output unit 4 includes a monitor and a speaker, and displays on the monitor the necessary video read from the data storage unit 6 in accordance with the control of the controller 5, and also outputs the necessary audio through the speaker.

The controller 5 includes an image coordinates setting unit 10, a coordinates extraction unit 11, a skeleton information acquisition unit 12, a behavior recognition unit 13, a behavior checking unit 14, and an action improvement proposal unit 15. The image coordinates setting unit 10 sets as the image coordinates a plurality of representative skeleton points provided to the upper body mainly including both hands of the subject person while estimating the posture of the upper body of the subject person based on the RGB images sequentially obtained from the RGB-D sensor 3.

Specifically, the image coordinates setting unit 10 sets the image coordinates on a two-dimensional coordinate system including one of the right and left shoulder portions of the subject person as the coordinate origin, the X-axis lying in the direction of a line connecting the right and left shoulder portions with reference to the coordinate origin, and the Z-axis lying in the vertical direction with respect to the X-axis. That is, the coordinate origin is moved to the right or left shoulder portion, and then, the XZ plane is rotated to coincide with the line connecting the right and left shoulder portions. This allows for the recognition of an action with increased robustness independently of the position of the RGB-D sensor 3.

The coordinates extraction unit 11 sequentially extracts from the image coordinates, which have been set by the image coordinates setting unit 10, image coordinates related to a hand-washing behavior of the subject person based on the transition state of the posture of the subject person. In practice, the coordinates extraction unit 11 needs to extract key parts of the upper body for the hand-washing behavior by assuming that the clothes and the surrounding environment of the subject person may change.

In response, the coordinates extraction unit 11 is configured to estimate the posture of both hands and obtain the image coordinates of the representative skeleton points of the both hands, using a lightweight OpenPose architecture with a trained model (i.e., a system for estimating the skeleton of a person through deep learning). Consequently, the coordinates extraction unit 11 sequentially extracts as the image coordinates a total of 60 representative skeleton points including 18 points in the torso of the upper body and 42 points in the both hands (i.e., 21 points in each hand) of the subject person. Note that when only stages 1 and 2 are used out of the six stages of the OpenPose architecture, the computation amount can be reduced by 32.4 [%].

The skeleton information acquisition unit 12 obtains pieces of temporally continuous three-dimensional skeleton information on mainly the both hands of the subject person by temporally synchronizing the image coordinates sequentially extracted by the coordinates extraction unit 11 with the depth images sequentially obtained from the RGB-D sensor 3.

Specifically, the skeleton information acquisition unit 12 forms a three-dimensional coordinate system by combining the depth images sequentially obtained from the RGB-D sensor 3 (with the depth direction of the depth images set as the Y-axis) with the two-dimensional coordinate system of the image coordinates sequentially extracted by the coordinates extraction unit 11, and thus obtains the three-dimensional skeleton information.

An equation for transforming the image coordinate system of the two-dimensional coordinate system into the world coordinate system of the three-dimensional coordinate system is represented by the following Formula (1).

[Formula 1]

$$X_W = R^{-1}\left(Z_C K^{-1}\begin{bmatrix} x_I \\ 1 \end{bmatrix} - t\right) \tag{1}$$

Herein, Xw=' [Xw, Yw, Zw] represents the coordinates in the world coordinate system, and $x_I={}^t[x_I, y_I]$ represents the coordinates in the image coordinate system. Symbol K (3×3 matrix) represents a parameter specific to the imaging device, symbol R (3×3 matrix) represents a rotation matrix for transforming the coordinates in the image coordinate system into those in the world coordinate system, symbol t (3×1 vector) represents a translation vector, and symbol $Z_C$ represents depth information corresponding to the two-dimensional coordinates in the image coordinate system.

Symbols K, R, and t have been calculated through camera calibration using the technique of Mr. Zhang ("A flexible new technique for camera calibration". IEEE Transactions on Pattern Analysis and Machine Intelligence, 22(11): 1330-1334, 2000). For the calibration to calculate the parameter K, a calibration board having circular dots printed thereon in a grid-like pattern has been used. The center coordinates of each dot on the calibration board have been calibrated to 1/1,000.

Figure 2:
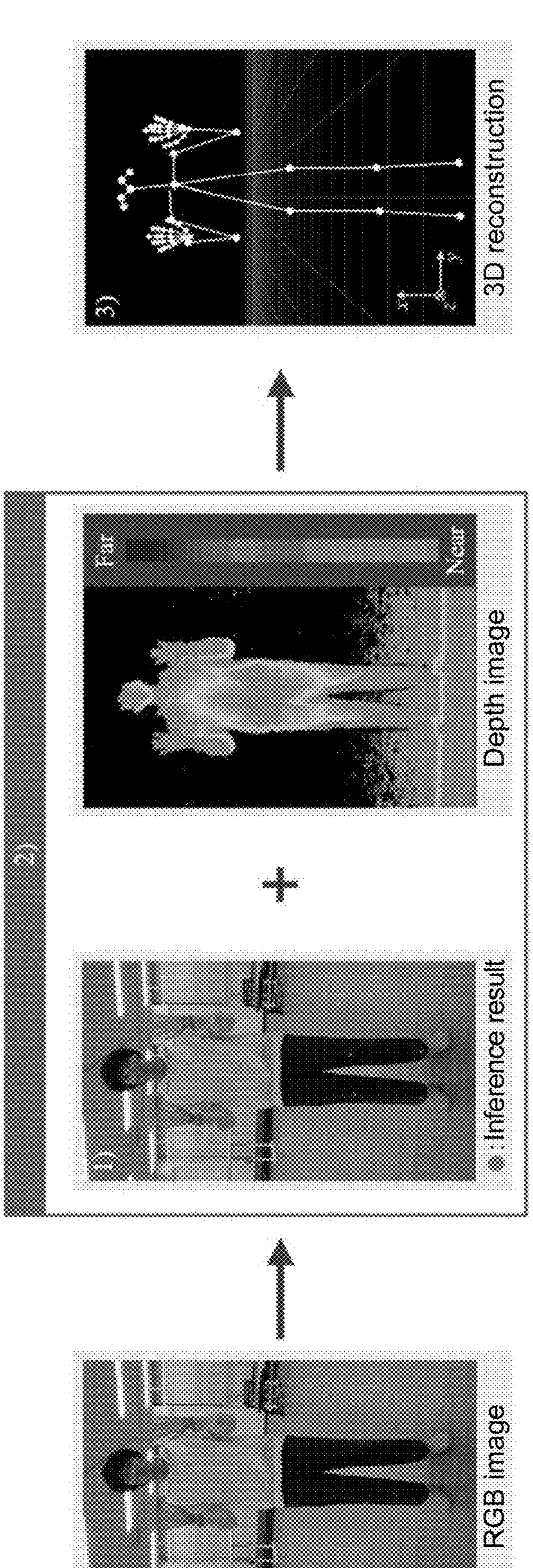
FIG. 2 is a schematic line diagram illustrating the procedures for obtaining three-dimensional skeleton information with the hand-washing monitoring apparatus illustrated in FIG. 1.

Consequently, as illustrated in FIG. 2, the hand-washing monitoring apparatus 1 can, for the upper body mainly including hands of the subject person, clarify the relationship between the position in the three-dimensional space and the position in the shot image, and thus obtain three-dimensional skeleton information while maintaining high robustness independently of the imaging position of the RGB-D sensor 3.

The behavior recognition unit 13 recognizes, from the transition state of the posture of the subject person, a hand-washing behavior, which is the linkage of a plurality of local actions, based on the pieces of three-dimensional skeleton information sequentially obtained by the skeleton information acquisition unit 12.

A hand-washing behavior has been defined with reference to a hand-washing behavior recommended by the Ministry of Health, Labour and Welfare in Japan. The following nine procedures are recommended as the proper procedures for a hand-washing behavior: "wet hands with running water," "apply soap to the hands," "rub palms well," "rub the back of the hands up and down," "rub the fingertips and nails," "wash between fingers," "twist and wash thumbs with the palms," "wash wrists," and "rinse the hands with running water."

Accordingly, the following eight local actions (A) to (H) have been defined as a hand-washing behavior as illustrated in FIG. 3. (A) Wet hands, (B) Apply soap, (C) Rub palm to palm, (D) Rub back of each hand, (E) Rub fingertips, (F) Rub between each finger, (G) Rub thumb, and (H) Rub wrist.

The behavior recognition unit 13 sequentially recognizes the relevant local actions from the pieces of three-dimensional skeleton information sequentially obtained by the skeleton information acquisition unit 12 with reference to a hand-washing-action recognition model constructed through deep learning by using as training data an action recognition pattern set for each local action.

Figure 4:
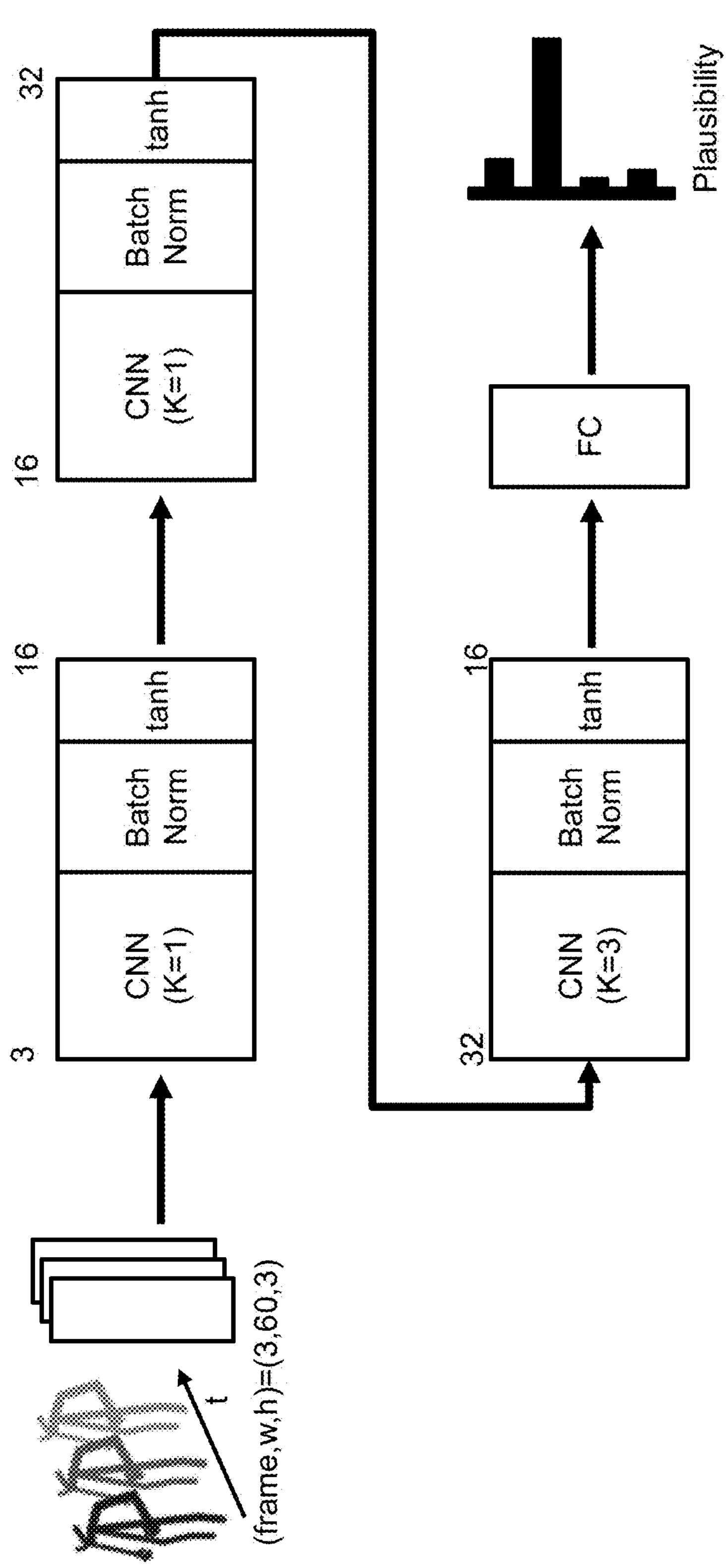
FIG. 4 is a conceptual view for describing the construction of a hand-washing-behavior recognition model.

Specifically, the behavior recognition unit 13 applies a hand-washing-behavior recognition model including three modules, which include a convolutional neural network (CNN) layer, a batch normalization (Batch Norm) layer, and an activation function (tanh function) layer; and a fully-connected layer as illustrated in FIG. 4 to recognize the foregoing eight local actions.

With the hand-washing-behavior recognition model, it is possible to determine the likelihood of each of nine actions including the eight local actions, which are related to a hand-washing behavior, and another action (i.e., an action other than hand washing) by using, as inputs, skeleton information of the current frame and skeleton information of two frames earlier.

Further, the behavior recognition unit 13 performs post-processing on an action with the highest frequency as the current local action among actions observed in 15 frames (i.e., the current frame and 14 frames before that) as a result of the recognition. In this manner, the behavior recognition unit 13 has learned a hand-washing-behavior recognition model through supervised learning by using its own dataset. For optimization, a cross-entropy loss function and Adam (adaptive movement estimation) with a learning rate of 0.001 have been used.

Consequently, the hand-washing monitoring apparatus 1 can significantly improve the recognition accuracy and the recognition speed for each local action based on the three-dimensional skeleton information.

The behavior checking unit 14 checks the hand-washing behavior recognized by the behavior recognition unit 13 by determining if the recognition accuracy of each local action of the hand-washing behavior is lower than a predetermined threshold.

Figures 5, 6:
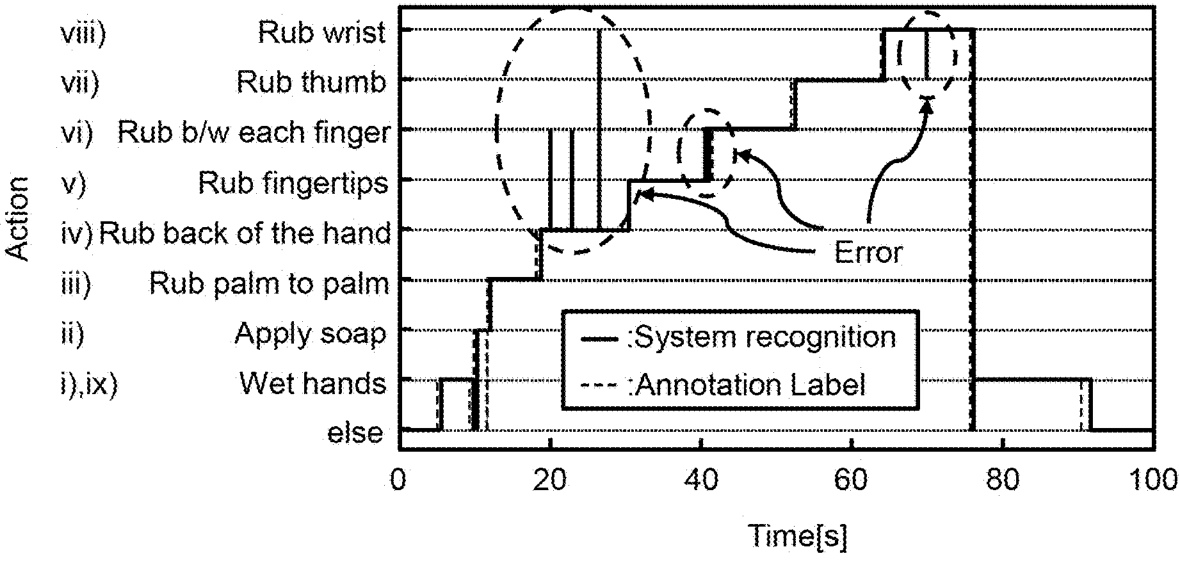
FIG. 5 is a chart representing the recognition rate of each local action of a hand-washing behavior.
FIG. 6 is a graph representing an example of the results of recognizing a series of local actions forming a hand-washing behavior.

A table in FIG. 5 represents the recognition rate (Accuracy) of each local action (Action) of the hand-washing behavior determined by actually conducting experiments with the hand-washing monitoring apparatus 1. It is found that the recognition rates are as follows: "Wet hands": 97.5 [%], "Apply soap": 95.9 [%], "Rub palm to palm": 98.7 [%], "Rub back of each hand": 67.0 [%], "Rub fingertips": 94.0 [%], "Rub between each finger": 97.2 [%], "Rub thumb": 91.9 [%], "Rub wrist": 94.1 [%], "another local action (else)": 90.6 [%]. The average recognition rate of all local actions is found to be 91.1 [%]. It is found that the recognition rate of each of the local actions other than "Rub back of each hand" is 90.0 [%] or more.

FIG. 6 illustrates an example of the results of recognizing a series of local actions forming a hand-washing behavior with the hand-washing monitoring apparatus 1. In FIG. 6, the abscissa axis represents the time axis, while a series of local actions are arranged on the ordinate axis. The dashed line indicates an annotation label (Annotation Label) as training data, and the solid line indicates the results of recognizing an action (System recognition) with the hand-washing monitoring apparatus 1.

According to the experiments, the results of recognizing the series of local actions with the hand-washing monitoring apparatus 1 resulted in errors in stages. Consequently, the action of "rubbing back of each hand" was recognized erroneously three times, the action of "rubbing between each finger" was recognized erroneously two times, the action of "rubbing wrists" was recognized erroneously once, and the action of "rubbing fingertips" was recognized erroneously once.

As described above, among the series of local actions recognized by the hand-washing monitoring apparatus 1, the recognition rate of the action of "rubbing back of each hand" is 67.0 [%], which is lower than the recognition rates of the other local actions. This is considered to be because the action of "rubbing back of each hand" is similar to the action of "rubbing between each finger" among the other actions of the hand-washing behavior.

In particular, it would be difficult to correctly determine the type of a local action being performed while the local action is switched to another local action or while the hand (i.e., right or left hand) being washed is switched to the other hand. Thus, annotating such a local action with "another local action (else)" that does not belong to any type of local action can improve the recognition accuracy of the local action.

Based on the results of the check performed by the behavior checking unit 14, the action improvement proposal unit 15 gives the subject person feedback about a proposal for improving a local action with recognition accuracy lower than the threshold among the local actions of the hand-washing behavior.

The video/audio output unit 4, which serves as a feedback means, outputs a video for prompting an improvement in the subject person local action, which has been selected by the action improvement proposal unit 15, to a display screen of the monitor, and also outputs audio for prompting an improvement in the local action through the speaker.

The hand-washing monitoring apparatus 1 with the foregoing configuration can give the subject person performing a hand-washing behavior, which mainly includes the actions of his/her fingertips, feedback about a proposal for improving his/her local action as needed while recognizing each local action in a non-contact manner, and can regularly perform monitoring without placing a physical or psychological burden on the subject person.

(2) Other Embodiments

As described above, this embodiment has described a case where the behavior checking unit 14 checks one's hand-washing behavior recognized by the behavior recognition unit 13 while determining if the recognition accuracy of each local action of the hand-washing behavior is lower than a predetermined threshold. However, the present invention is not limited thereto. For example, it is also possible to set in advance a threshold for determining a shortage of the action time of each local action, and determine if each local action has terminated within its corresponding threshold so as to confirm that a local action that has terminated within its threshold is recognized erroneously.

Then, the action improvement proposal unit 15 gives feedback about a proposal for improving the local action that has been confirmed to be recognized erroneously by the behavior checking unit 14. Consequently, the hand-washing monitoring apparatus 1 can determine, with relatively high accuracy, if each of a plurality of local actions forming a hand-washing behavior of a subject person has been recognized erroneously.

Figures 7, 8:
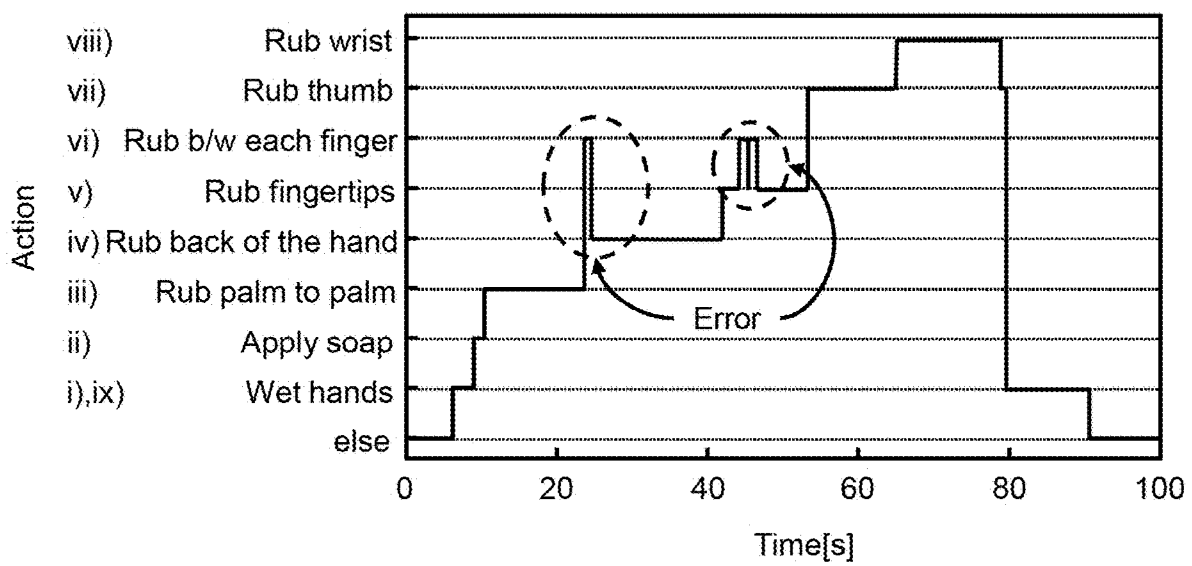
FIG. 7 is a chart representing the number of frames in which local actions not performed by a subject person were recognized erroneously.
FIG. 8 is a graph illustrating the results of recognizing a hand-washing behavior with the hand-washing monitoring apparatus.

As a prerequisite therefor, experimental trials for detecting errors in a hand-washing behavior with the hand-washing monitoring apparatus 1 were actually performed five times. FIG. 7 illustrates the number of frames (Frames) in which local actions not performed by the subject person (Actions NOT performed) were recognized erroneously by the present apparatus. According to the results of the five trials, it is found that in trials 1 and 4, local actions not performed by the subject person were not recognized erroneously, while in trials 2, 3, and 5, local actions not performed by the subject person were recognized erroneously.

Figure 9:
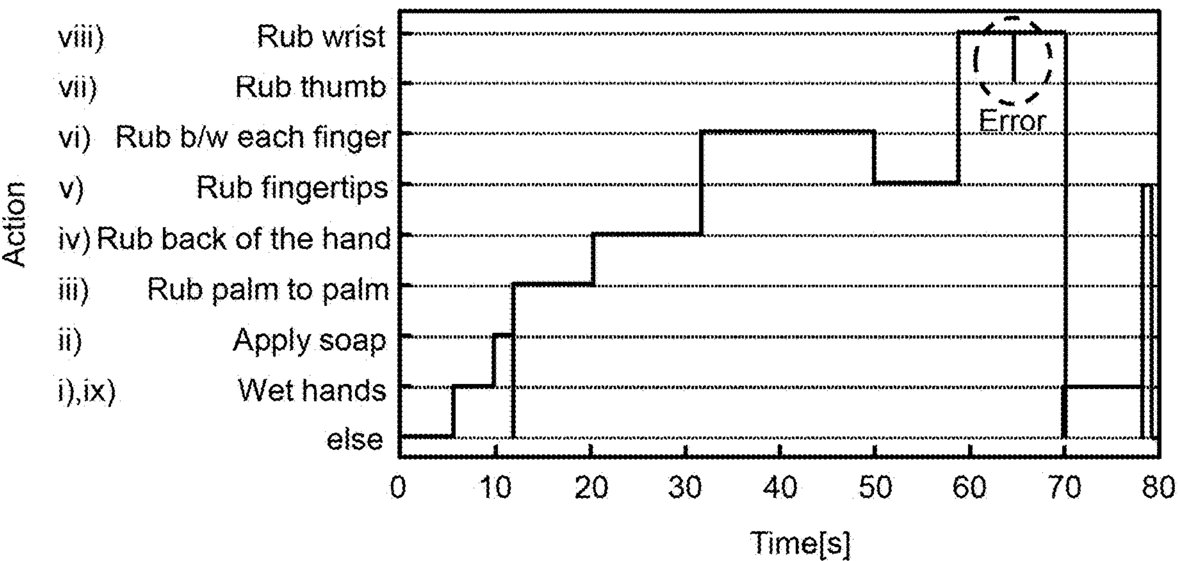
FIG. 9 is a graph illustrating the results of recognizing a hand-washing behavior with the hand-washing monitoring apparatus.
Figure 10:
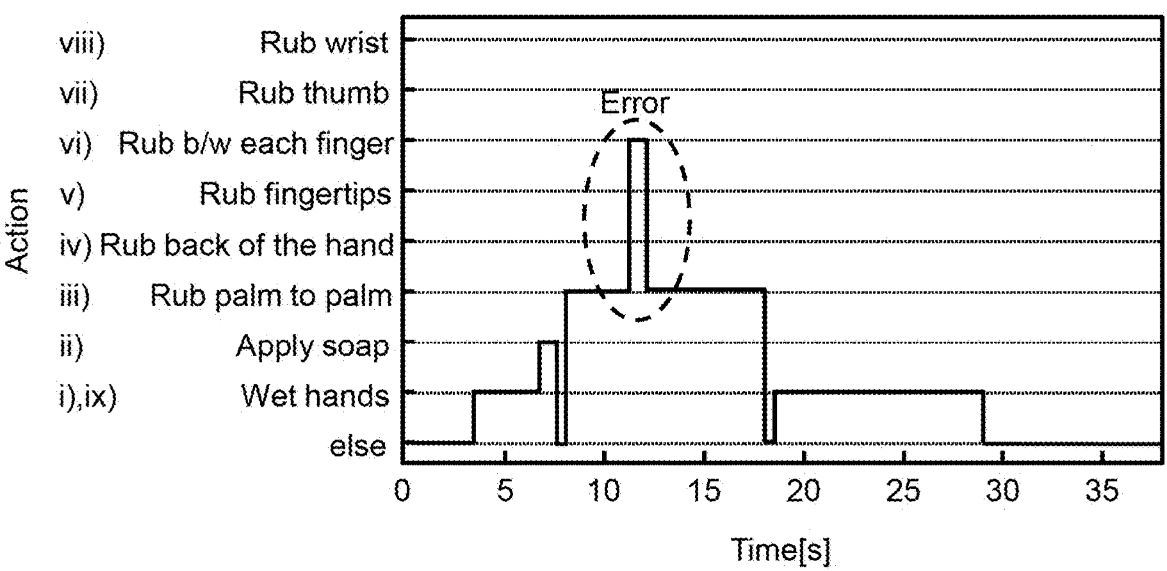
FIG. 10 is a graph illustrating the results of recognizing a hand-washing behavior with the hand-washing monitoring apparatus.

In the trial 2, the action of "rubbing between each finger" not performed by the subject person was recognized erroneously in 92 frames. In the trial 3, the action of "rubbing thumbs" was recognized erroneously in 6 frames. In the trial 5, the action of "rubbing between each finger" was recognized erroneously in 24 frames. FIGS. 8, 9, and 10 illustrate the results of recognizing the hand-washing behavior with the hand-washing monitoring apparatus 1 regarding the trials 2, 3, and 5 in which erroneous recognition occurred, respectively.

As described above, in the trials 2, 3, and 5, local actions not performed by the subject person were recognized erroneously. This is considered to be because there is a limit on the classification accuracy of the hand-washing-behavior recognition model of the hand-washing monitoring apparatus 1 according to this embodiment. In the 92 frames of the trial 2 containing the largest number of erroneous recognition in the error detection experiment, the recognition time was 3.0 seconds, which was shorter than the time required for each of the other local actions.

Therefore, by setting in advance a threshold for determining a shortage of the action time of each local action, and determining if each local action has terminated within its corresponding threshold as described above, it is possible to confirm that a local action that has terminated within its corresponding threshold is recognized erroneously (i.e., the action is not proper), and thus give an appropriate instruction or proposal.

This embodiment has described a case where the action improvement proposal unit 15 is configured to, based on the results of the check performed by the behavior checking unit 14, give the subject person feedback about a proposal for improving a local action with recognition accuracy lower than its threshold among local actions of a hand-washing behavior. However, the present invention is not limited thereto, and the action improvement proposal unit 15 is configured to, regarding a local action that has not been recognized by the behavior recognition unit 13 due to a lack of three-dimensional skeleton information among local actions of a hand-washing behavior, give feedback to the effect that the local action is not recognizable.

Consequently, the hand-washing monitoring apparatus 1 can, even for a local action that has not been recognized due to a lack of three-dimensional skeleton information, such as when the two hands of the subject person are too close or when the fingertips of the two hands are overlapping, give the subject person feedback to that effect, and inform the subject person under what circumstances such a local action is not recognizable.

Further, this embodiment has described a case where a hand-washing monitoring apparatus is applied as the hand-motion monitoring apparatus. The hand-washing monitoring apparatus can be widely applied to various hand-motion monitoring apparatuses as long as it can prompt a subject person to improve his/her hand-motion behavior while monitoring the hand-motion behavior without placing a physical or psychological burden on the subject person.

For example, the interactive information transfer system described in Japanese Patent No. 7157424 of the inventor of the present application is applicable to the hand-motion monitoring apparatus according to the present invention. The interactive information transfer system is configured to allow an expert to instruct a collaborator in their skills regarding specific work while making the expert and the collaborator mutually exchange information via a network.

In practice, in the interactive information transfer system, the expert transfers the position of their line-of-sight end to the collaborator on a real-time basis while visually watching the same video as the video mainly subject personed at the object handled by the collaborator; and, at the same time, the expert gives instructions to transfer the three-dimensional directional movements of their own fingertips to the respective fingers of the collaborator as the force sense on a real-time basis, while the transfer result is fed back to the expert. As a result, when the collaborator performs their own work, the collaborator can indirectly receive the expert's instructions of the manual skills, that is, the expert's tacit knowledge on a real-time basis, while sharing realistic sensations with the expert at the remote location. Furthermore, the expert can perceive gaps between their own instruction content and the collaborator's response content on a real-time basis by perceiving the result of the force sense transfer to the collaborator in the feedback manner.

The hand-motion monitoring apparatus gives the collaborator performing a hand-motion behavior, which mainly includes the actions of his/her fingertips, feedback about a proposal for improving his/her local action as needed while recognizing each local action in a non-contact manner, using as a reference (i.e., training data) a hand-motion behavior mainly including the actions of the fingertips of the expert in the interactive information transfer system. Consequently, it is possible to implement a hand-motion monitoring apparatus that can regularly perform monitoring without placing a physical or psychological burden on the collaborator.

In addition, the upper limb motion support apparatus described in Japanese Patent No. 6763968 of the inventor of the present application is applicable to the hand-motion monitoring apparatus according to the present invention. The upper limb motion support apparatus enables a robot arm mounted on a table to be operated in coordination with an operator's hand.

In practice, in the upper limb motion support apparatus, the controller causes the robot arm (i.e., the articulated arm and the end effector) to perform the cooperative motion in conjunction with the upper limb motion of the operator while referring to content recognized by the upper limb motion recognition unit and also appropriately controlling the robot arm so that the imaging unit captures images of the operator's face and an extended end of the operator's line of sight alternately at desired switching timing. As a result, the upper limb motion support apparatus can follow the operator's intention while recognizing an object located at the extended end of the operator's line of sight on a real-time basis and can cause the articulated arm and the end effector to perform the motion in coordination with the operator's hand.

The hand-motion monitoring apparatus gives the robot arm performing a hand-motion behavior, which mainly includes the actions of its fingertips (i.e., the end effector), feedback about a proposal for improving its local action as needed while recognizing each local action in a non-contact manner, using as a reference (i.e., training data) a hand-motion behavior that is the upper limb motion of the operator in the upper limb motion support apparatus. Consequently, it is possible to implement a hand-motion monitoring apparatus that can regularly perform monitoring on the cooperative motion of the robot arm.

REFERENCE SIGNS LIST

1 hand-washing monitoring apparatus
2 control unit
3 RGB-D sensor (i.e., imaging unit)
4 video/audio output unit
5 controller
6 data storage unit
10 image coordinates setting unit
11 coordinates extraction unit
12 skeleton information acquisition unit
13 behavior recognition unit
14 behavior checking unit
15 action improvement proposal unit

The invention claimed is:

1. A hand-motion monitoring apparatus comprising:

an imaging unit that sequentially obtains RGB images and depth images by imaging an upper body including both hands of a subject person;

an image coordinates setting unit that sets, as image coordinates, a plurality of representative skeleton points provided to the upper body mainly including the both hands of the subject person while estimating a posture of the upper body of the subject person based on the RGB images sequentially obtained from the imaging unit;

a coordinates extraction unit that sequentially extracts, from the image coordinates set by the image coordinates setting unit image, coordinates related to a hand-motion behavior of the subject person based on a transition state of the posture of the subject person;

a skeleton information acquisition unit that obtains pieces of temporally continuous three-dimensional skeleton information on mainly the both hands of the subject person by temporally synchronizing the image coordinates sequentially extracted by the coordinates extraction unit with the depth images sequentially obtained from the imaging unit;

a behavior recognition unit that recognizes, from the transition state of the posture of the subject person, a hand-motion behavior that is a linkage of a plurality of local actions based on the pieces of three-dimensional skeleton information sequentially obtained by the skeleton information acquisition unit;

a behavior checking unit that checks the hand-motion behavior recognized by the behavior recognition unit while determining if recognition accuracy of each of the local actions of the hand-motion behavior is lower than a predetermined threshold; and an action improvement proposal unit that, based on a result of the check performed by the behavior checking unit, gives the subject person feedback about a proposal for improving a local action with recognition accuracy lower than the threshold among the local actions of the hand-motion behavior.

2. The hand-motion monitoring apparatus according to claim 1, wherein the image coordinates setting unit sets the image coordinates on a two-dimensional coordinate system including one of right and left shoulder portions of the subject person as a coordinate origin, an X-axis lying in a direction of a line connecting the right and left shoulder portions with reference to the coordinate origin, and a Z-axis lying in a vertical direction with respect to the X-axis, and the skeleton information acquisition unit forms a three-dimensional coordinate system by combining the depth images sequentially obtained from the imaging unit with the two-dimensional coordinate system of the image coordinates sequentially extracted by the coordinates extraction unit while setting a depth direction of the depth images as a Y-axis, and thus obtains the three-dimensional skeleton information.

3. The hand-motion monitoring apparatus according to claim 1, wherein the behavior recognition unit sequentially recognizes the local actions from the pieces of three-dimensional skeleton information sequentially obtained by the skeleton information acquisition unit while referring to a hand-motion-action recognition model that has been constructed through deep learning by using as training data an action recognition pattern set for each local action.

4. The hand-motion monitoring apparatus according to claim 1, wherein the behavior checking unit sets in advance a threshold for determining a shortage of action time of each local action so as to determine if each local action has terminated within the corresponding threshold, and confirms that a local action that has terminated within the corresponding threshold is recognized erroneously, and the action improvement proposal unit gives feedback about a proposal for improving the local action that has been confirmed to be recognized erroneously by the behavior checking unit.

5. The hand-motion monitoring apparatus according to claim 1, wherein regarding a local action that has not been recognized by the behavior recognition unit due to a lack of the three-dimensional skeleton information among the local actions of the hand-motion behavior, the action improvement proposal unit gives feedback to the effect that the local action is not recognizable.

6. A hand-motion monitoring method comprising:

a first step of sequentially obtaining RGB images and depth images by imaging an upper body including both hands of a subject person;

a second step of setting, as image coordinates, a plurality of representative skeleton points provided to the upper body mainly including the both hands of the subject person while estimating a posture of the upper body of the subject person based on the RGB images sequentially obtained in the first step;

a third step of sequentially extracting from the image coordinates set in the second step image coordinates related to a hand-motion behavior of the subject person based on a transition state of the posture of the subject person;

a fourth step of obtaining pieces of temporally continuous three-dimensional skeleton information on mainly the both hands of the subject person by temporally synchronizing the image coordinates sequentially extracted in the third step with the depth images sequentially obtained in the first step;

a fifth step of recognizing, from the transition state of the posture of the subject person, a hand-motion behavior that is a linkage of a plurality of local actions based on the pieces of three-dimensional skeleton information sequentially obtained in the fourth step;

a sixth step of checking the hand-motion behavior recognized in the fifth step while determining if recognition accuracy of each of the local actions of the hand-motion behavior is lower than a predetermined threshold; and a seventh step of, based on a result of the check performed in the sixth step, giving the subject person feedback about a proposal for improving a local action with recognition accuracy lower than the threshold among the local actions of the hand-motion behavior.

7. The hand-motion monitoring method according to claim 6, wherein the second step includes setting the image coordinates on a two-dimensional coordinate system including one of right and left shoulder portions of the subject person as a coordinate origin, an X-axis lying in a direction of a line connecting the right and left shoulder portions with reference to the coordinate origin, and a Z-axis lying in a vertical direction with respect to the X-axis, and the fourth step includes forming a three-dimensional coordinate system by combining the depth images sequentially obtained in the first step with the two-dimensional coordinate system of the image coordinates sequentially extracted in the third step while setting a depth direction of the depth images as a Y-axis, and thus obtaining the three-dimensional skeleton information.

8. The hand-motion monitoring method according to claim 6, wherein the fifth step includes sequentially recognizing the local actions from the pieces of three-dimensional skeleton information sequentially obtained in the fourth step while referring to a hand-motion-action recognition model that has been constructed through deep learning by using as training data an action recognition pattern set for each local action.

9. The hand-motion monitoring method according to claim 6, wherein the sixth step includes setting in advance a threshold for determining a shortage of action time of each local action so as to determine if each local action has terminated within the corresponding threshold, and confirms that a local action that has terminated within the corresponding threshold is recognized erroneously, and the seventh step includes, regarding the local action that has been confirmed to be recognized erroneously in the sixth step, giving feedback about a proposal for improving the local action.

10. The hand-motion monitoring method according to claim 6, wherein the seventh step includes, regarding a local action that has not been recognized in the fifth step due to a lack of the three-dimensional skeleton information among the local actions of the hand-motion behavior, giving feedback to the effect that the local action is not recognizable.

* * * * *